US012803788B2

(12) United States Patent
Dhanawade et al.

(10) Patent No.: US 12,803,788 B2
(45) Date of Patent: Nov. 17, 2026

(54) REVOCABLE CRYPTOGRAPHIC KEYS

(71) Applicant: XILINX, INC., San Jose, CA (US)

(72) Inventors: Mohan Marutirao Dhanawade, Hyderabad (IN); James D. Wesselkamper, Albuquerque, NM (US)

(73) Assignee: XILINX, INC., San Jose, CA (US)

( * ) Notice: Subject to any disclaimer, the term of this patent is extended or adjusted under 35 U.S.C. 154(b) by 177 days.

(21) Appl. No.: 18/781,944

(22) Filed: Jul. 23, 2024

(65) Prior Publication Data

US 2026/0031977 A1 Jan. 29, 2026

(51) Int. Cl.
*H04L 9/08* (2006.01)

(52) U.S. Cl.
CPC .......... *H04L 9/0822* (2013.01); *H04L 9/0869* (2013.01); *H04L 9/0891* (2013.01)

(58) Field of Classification Search
None
See application file for complete search history.

(56) References Cited

U.S. PATENT DOCUMENTS 8,068,516 B1 * 11/2011 Oz .......................... H04L 9/088 725/111
8,108,362 B2 1/2012 Hydrie et al.
8,549,087 B2 10/2013 Leonard
9,836,906 B2 12/2017 Carstens et al.
10,334,062 B2 6/2019 Benson et al.
2006/0117177 A1 * 6/2006 Buer ..................... H04L 9/0897 713/155
2014/0245009 A1 * 8/2014 Pinder ..................... G06F 21/10 713/171
2018/0167381 A1 * 6/2018 Roth ..................... H04L 9/0891
2019/0013936 A1 * 1/2019 Murray .................. H04L 9/088
2019/0044746 A1 * 2/2019 Kang .................... H04L 12/282
2022/0006653 A1 * 1/2022 Ghetie .................. G06F 21/575
2022/0360979 A1 * 11/2022 Santhana Krishnan .................... H04W 12/041
2023/0083785 A1 * 3/2023 Maiman ............. G07C 9/00309 340/5.65
2024/0056290 A1 * 2/2024 Wilson .................. H04L 9/0897
2024/0160582 A1 * 5/2024 Gonabal ............. G06F 12/1466
2025/0279880 A1 * 9/2025 Balabine ................. H04L 9/088

* cited by examiner

*Primary Examiner* — Bassam A Noaman
(74) *Attorney, Agent, or Firm* — Patterson + Sheridan, LLP

(57) ABSTRACT

Examples herein describe revocable cryptographic keys. An integrated circuit includes an input/output interface configured to receive inputs including plaintext user keys, metadata, and revocation bits. Cryptographic circuitry is configured to read a key from a first memory. Plaintext user keys are encrypted based on the key to provide encrypted user keys. Metadata is encrypted based on the key to provide encrypted metadata. Revocation bits are encrypted based on the key to provide encrypted revocation bits. A Galois/Counter Mode (GCM) tag is computed based on the key. A processor is configured to write the encrypted user keys, the encrypted metadata, the encrypted revocation bits, and the GCM tag to a second memory to provision the plaintext user keys.

20 Claims, 11 Drawing Sheets

REVOCABLE CRYPTOGRAPHIC KEYS

TECHNICAL FIELD

Examples of the present disclosure generally relate to cryptographic keys, and more specifically, to revocable cryptographic keys.

BACKGROUND

A crypto period of a cryptographic key defines a timeframe within which the cryptographic key can be used. Conventionally, crypto periods are specified in two ways: "not before" and "not after." "Not before" defines a date and time when the cryptographic key can begin being used. "Not after" defines a date and time when the cryptographic key must stop being used. Revocation of a cryptographic key refers to a process in which a notice is made available to affected entities that the key should be removed from operational use prior to the "not after" date and time. Reasons for revoking a particular key include identifying that the particular key is lost or stolen, a device holding the particular key is compromised, the particular key becomes insecure, etc. In order to revoke a cryptographic key stored in a device, the device must be informed in a persistent manner (e.g., non-volatile) that the key should not be used again. Typically, this is accomplished by reserving bits of a programmable electronic fuse in the device such that each bit is uniquely associated with a corresponding key. A key is revoked by setting the bit associated with the key which indicates to the device that the key is revoked. Before using a key, the device checks if the key is revoked and only uses the key if the key is not revoked. However, adding bits to an electronic fuse is economically expensive, so device manufacturers include a limited number of these bits in devices. Once all of the key revocation bits in a device have been set, any additional cryptographic keys stored in the device are no longer revocable.

SUMMARY

Revocable cryptographic keys are described in some embodiments. In various embodiments, an integrated circuit includes an input/output interface configured to receive inputs including plaintext user keys, metadata, and revocation bits. Cryptographic circuitry is configured to read a key from a first memory. Plaintext user keys are encrypted based on the key to provide encrypted user keys. Metadata is encrypted based on the key to provide encrypted metadata. Revocation bits are encrypted based on the key to provide encrypted revocation bits. A Galois/Counter Mode (GCM) tag is computed over the user keys and the metadata based on the key. A processor is configured to write the encrypted user keys, the encrypted metadata, the encrypted revocation bits, and the GCM tag to a second memory to provision the plaintext user keys.

A system is described in some embodiments. The system includes one or more processors and at least one memory coupled to the one or more processors. The at least one memory includes a set of instructions that, when executed by the one or more processors, cause the one or more processors to read a user key, metadata, and revocation bits from a non-volatile memory. The user key, the metadata and the revocation bits are encrypted. The one or more processors compute a first Galois/Counter Mode (GCM) tag based on the user key and the metadata using a symmetric key stored in a first memory. The one or more processors compare the first GCM tag to a second GCM tag stored in a second memory to provide a comparison. The one or more processors determine validity of the user key based on the comparison and a revocation status identified using the revocation bits.

A method is described in some embodiments. The method includes reading a user key, metadata, revocation bits, a first counter value, a usage limit, and a usage from a non-volatile memory. The user key, the metadata, the revocation bits, the first counter value, the usage limit, and the usage are encrypted. A first Galois/Counter Mode (GCM) tag is computed based on the user key and the metadata using a symmetric key stored in a first memory. A second GCM tag and a second counter value are read from a second memory. The first GCM tag is compared to the second GCM tag, the first counter value is compared to the second counter value, and the usage is compared to the usage limit. The user key is invalidated based on at least one of comparing the first GCM tag to the second GCM tag, comparing the first counter value to the second counter value, comparing the usage to the usage limit, or a revocation status identified using the revocation bits.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1A:
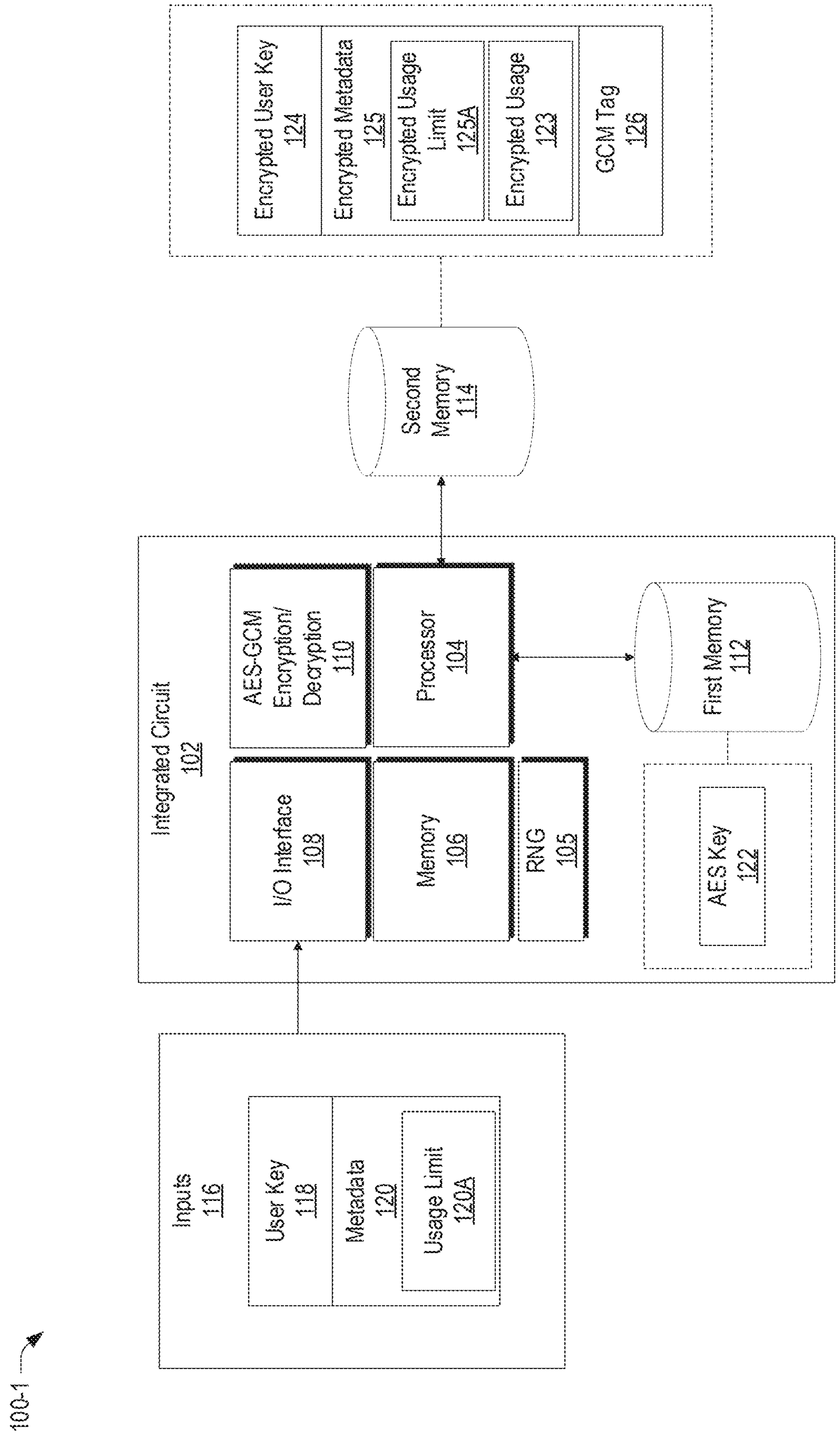
FIG. 1A illustrates a representation of provisioning a user key, according to some embodiments.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

In order to revoke a cryptographic key stored in a device, the device must ensure that the key is no longer usable for authentication, decryption, or encryption. Conventionally, this is accomplished by reserving bits of a programmable electronic fuse included in the device such that each bit is uniquely associated with a corresponding cryptographic key. A key is revoked by irreversibly setting the bit associated with the key which indicates to the device that the key is revoked. The device checks if a key is revoked before using the key and only uses the key if the key is not revoked. However, adding bits to an electronic fuse is economically costly. As a result, device manufacturers only include a limited number of these bits in devices. Because of the limited number of key revocation bits, only a limited number of cryptographic keys stored in a device are revocable.

Examples herein describe revocable cryptographic keys. In some embodiments, an Advanced Encryption Standard (AES) key is generated using a random number generator (RNG). In various embodiments, the AES key is utilized in cryptographic circuitry such as AES-Galois/Counter Mode (GCM) encryption/decryption circuitry to encrypt a plaintext user key and metadata associated with the user key. In some embodiments, the metadata can describe/include a crypto period including a usage limit for the user key in addition to “not after” and “not before” dates and times. The “not after” and “not before” dates and times do not limit a number of potential attacks on or uses of the user key between the “not before” date/time and the “not after” date/time. In order to address this limitation, the usage limits uses of the user key between the “not before” date/time and the “not after” date/time in terms of numbers of blocks processed, numbers of bytes processed (e.g., an amount of data processed), numbers of cryptographic operations performed using the user key, or other uses of the user key.

Cryptographic circuitry, referred to herein as AES-GCM encryption/decryption circuitry, outputs an encrypted user key, encrypted metadata with an encrypted usage limit, and a GCM tag. In one or more examples, the encrypted user key can be decrypted using the AES key and the AES-GCM encryption/decryption circuitry to recover the plaintext user key and the metadata including the usage limit. An additional GCM tag is computed based on the encrypted user key and the metadata. If the GCM tag matches the additional GCM tag, then the user key, the metadata, and/or the GCM tag have not been modified and the user key can be authenticated/validated.

In order to provision a cryptographic key such that the cryptographic key is useable to perform encryption/decryption/verification operations, an input/output (I/O) interface of an integrated circuit receives the plaintext user key, the metadata, and the usage limit included in the metadata as inputs. A processor of the integrated circuit executes instructions which cause the processor to generate the AES key using the RNG and write the AES key to a first memory. In certain embodiments, the first memory is non-transitory or quasi-non-transitory such as battery-backed random access memory (BBRAM). In some embodiments, the processor has write-only access to the first memory and the AES-GCM encryption/decryption circuitry has read-only access to the first memory.

In various embodiments, the AES-GCM encryption/decryption circuitry uses the AES key to encrypt the plaintext user key, the metadata, the usage limit included in the metadata, a usage included in the metadata, and to compute the GCM tag. In one or more embodiments, the processor executes instructions that cause the processor to write the encrypted user key, the encrypted metadata including the encrypted usage limit and the encrypted usage, and the GCM tag to a second memory to provision the user key. The second memory can be external to the integrated circuit. Once the user key is provisioned, the user key is available for use in cryptographic operations.

In order to validate a provisioned (e.g., an available) cryptographic key, the processor executes instructions that cause the processer to read an encrypted user key, encrypted metadata, the encrypted usage limit included in the metadata, and the encrypted usage included in the metadata from a non-volatile memory. The AES-GCM encryption/decryption circuitry uses the AES key stored in the first memory to compute the additional GCM tag based on the encrypted user key and the metadata. The processor executes instructions that cause the processor to compare the GCM tag to the additional GCM tag. If the GCM tag matches the additional GCM tag, then the user key is validated. If the GCM tag does not match the additional GCM tag, then the user key is invalidated. If the GCM tag matches the additional GCM tag, then the usage limit is compared to the usage. If the usage is greater than or equal to the usage limit, then a request to use the user key is rejected and an error code is returned. If the usage is not greater than or equal to the usage limit, then the user key is allowed to perform a cryptographic operation.

In some embodiments, the processor executes instructions that cause the processor to read encrypted revocation bits and/or an encrypted counter value from the non-volatile memory. The revocation bits indicate whether a particular provisioned cryptographic key has been revoked/invalidated (and should no longer be provisioned for use in cryptographic operations), and the counter value is a unique value that is incremented by the processor and written to the first memory. If a counter value associated with provisioned cryptographic keys does not match a counter value stored in the first memory, then the provisioned cryptographic keys are invalidated. Because the described systems do not rely on bits of a programmable electronic fuse for revoking cryptographic keys, a nearly unlimited number of cryptographic keys can be revoked which is not possible using conventional systems.

FIG. 1A illustrates a representation 100-1 of provisioning a user key, according to some embodiments. As used herein, the term “provisioning” a user key refers to causing the user key to be available for use in cryptographic operations such as encryption/decryption/verification operations. The representation 100-1 is illustrated to include an integrated circuit 102. In one or more embodiments, the integrated circuit 102 is representative of a variety of different types of integrated circuits such as field-programmable gate arrays (FPGAs), Systems-on-Chips (SoCs), application-specific integrated circuits (ASICs), etc.

In some embodiments, the integrated circuit 102 includes a processor 104, a random number generator (RNG) 105, a memory 106, an input/output (I/O) interface 108, a first memory 112, and cryptographic circuitry, depicted here as Advanced Encryption Standard (AES) and Galois/Counter Mode (GCM) encryption/decryption (AES-GCM encryption/decryption circuitry) 110. In various embodiments, the processor 104 is representative of a variety of types of processors such as central processing units (CPUs), graphics processing units (GPUs), processors implemented using FPGAs (e.g., a soft processors), accelerators, etc. In some examples, the processor 104 includes multiple processors. In one or more examples, the memory 106 is non-volatile memory and/or volatile memory. The memory 106 can include main memory for storing instructions for the processor 104 to execute, and the memory 106 may include data for the processor 104 to operate on. For instance, the memory 106 includes one or more non-transitory computer readable media storing executable instructions.

In one or more embodiments, the AES-GCM encryption/decryption circuitry 110 is implemented in hardware, software, firmware, or combinations thereof. In various examples, the AES-GCM encryption/decryption circuitry 110 includes dedicated hardware cores of the integrated circuit 102. In some embodiments, the GCM functions of the AES-GCM encryption/decryption circuitry 110 are performed by software running on processor cores embedded in the integrated circuit 102 to provide authenticated encryption and integrity verification.

The processor 104 is illustrated to be communicatively coupled to the first memory 112 and a second memory 114. In one or more embodiments, the first memory 112 may be non-volatile memory or quasi-non-volatile memory such as battery-backed random access memory (BBRAM). In some embodiments, the processor 104 has write-only access to the first memory 112 and the AES-GCM encryption/decryption circuitry 110 has read-only access to the first memory 112. The second memory 114 can be volatile memory or non-volatile memory. In various embodiments, the second memory 114 is external to the integrated circuit 102.

In the representation 100-1, the I/O interface 108 is illustrated as receiving inputs 116 including a user key 118, metadata 120, and a usage limit 120A included in the metadata 120. In some embodiments, the user key 118 is a plaintext key and the metadata 120 is associated with the plaintext key. For example, the metadata 120 may describe contextual information about the user key 118 such as protocol information, permissions, timestamps (e.g., a key generation date/time), a crypto period (e.g., a "not before" date/time and a "not after" date/time) for the user key 118, etc. Notably, the "not before" date/time and the "not after" date/time of the crypto period do not limit a number of potential attacks on or uses of the user key 118 between the "not before" date/time and the "not after" date/time. To overcome this limitation, the usage limit 120A limits use of and attacks on the user key 118 between the "not before" date/time and the "not after" date/time. For example, the usage limit 120A can define a maximum number of blocks processed, bytes processed, and/or cryptographic operations performing using the user key 118. In order to provision the user key 118 as a revocable cryptographic key (e.g., cause the user key 118 to become available for performing cryptographic operations subject to revocation), the processor 104 implements the RNG 105 to generate a random AES key 122. In one or more embodiments, the processor 104 executes instructions which cause the processor 104 to write the AES key 122 to the first memory 112. In certain embodiments, the AES key 122 can be a symmetric key (e.g., usable for encryption and decryption).

In some embodiments, the instructions executed by the processor 104 also cause the processor 104 to implement the AES-GCM encryption/decryption circuitry 110 to use the AES key 122 as a key for encrypting the plaintext user key 118 as an encrypted user key 124, encrypting the metadata 120 as encrypted metadata 125, encrypting the usage limit 120A as an encrypted usage limit 125A, and encrypting a usage as an encrypted usage 123. Notably, in various examples, a default system value of the AES key 122 (e.g., all zeros) is an invalid key to prevent an adversary from clearing the AES key 122 to perform a replay attack. The AES-GCM encryption/decryption circuitry 110 also computes a GCM tag 126 by performing Galois field multiplication using the encrypted user key 124 and the metadata 120. In one or more embodiments, the processor 104 executes instructions that cause the processor 104 to write the encrypted user key 124, the encrypted metadata 125, the encrypted usage limit 125A included in the encrypted metadata 125, the encrypted usage 123 included in the encrypted metadata 125, and the GCM tag 126 to the second memory 114 and the user key 118 is provisioned (e.g., made available for use).

Figure 1B:
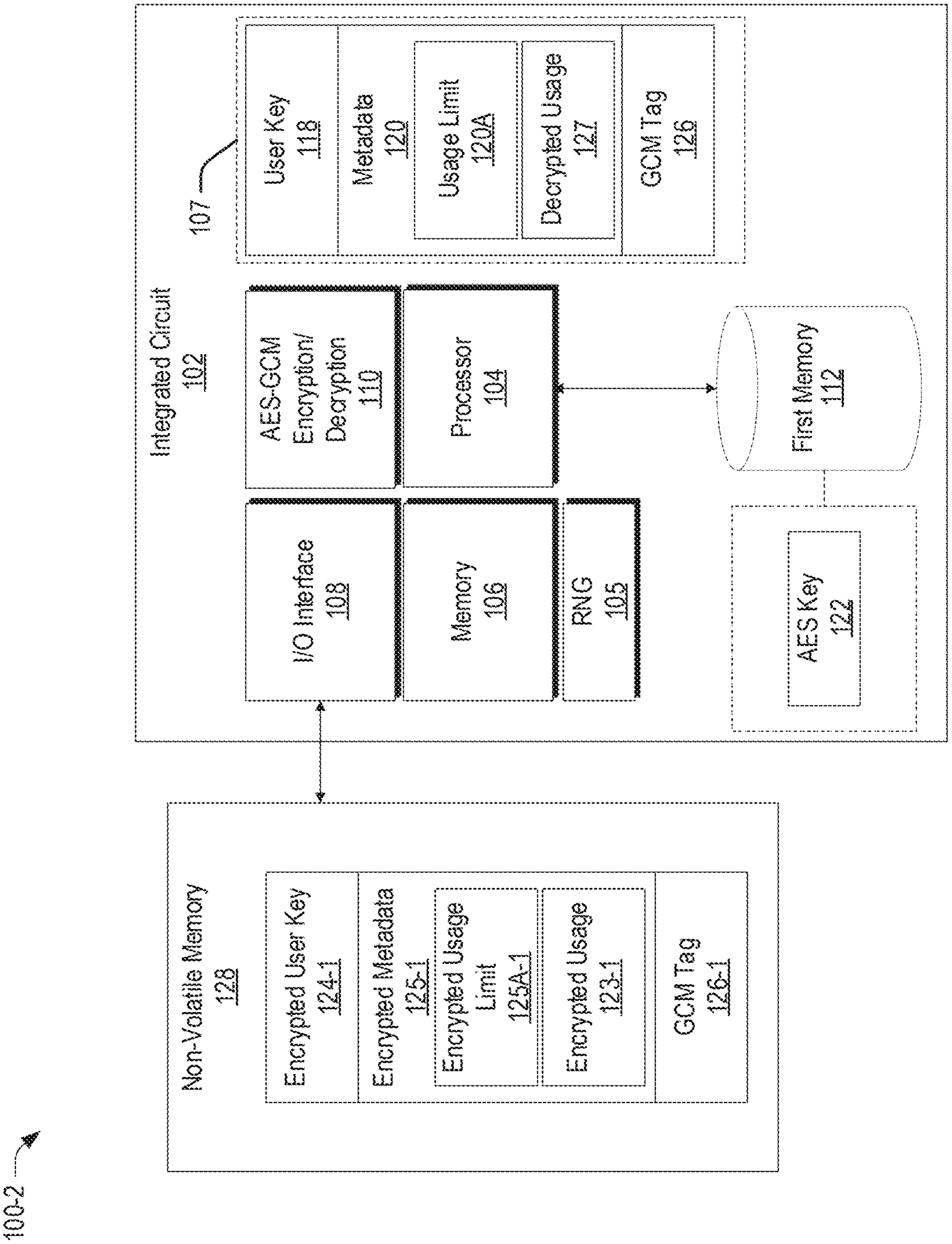
FIG. 1B illustrates a representation of validating/invalidating a user key, according to some embodiments.

FIG. 1B illustrates a representation 100-2 of validating/invalidating a user key, according to some embodiments. As shown in the representation 100-2, the processor 104 executes instructions which cause the processor to 104 read an encrypted user key 124-1, encrypted metadata 125-1, an encrypted usage limit 125A-1 included in the encrypted metadata 125-1, an encrypted usage 123-1 included in the encrypted metadata 125-1, and a GCM tag 126-1 from a non-volatile memory 128 via the I/O interface 108. In some embodiments, the AES-GCM encryption/decryption circuitry 110 decrypts the encrypted user key 124-1, the encrypted metadata 125-1, the encrypted usage limit 125A-1, and the encrypted usage 123-1 and stores plaintext outputs along with a calculated GCM tag 126 in a third memory 107. In order to validate or invalidate the user key 118, the processor 104 executes instructions which cause the processor 104 to read the GCM tag 126 from the third memory 107 that is an internal memory of the integrated circuit 102. The third memory 107 can include non-volatile memory and/or volatile memory.

In various embodiments, the processor 104 executes instructions that cause the processor 104 to compare the GCM tag 126-1 to the GCM tag 126. If the GCM tag 126-1 matches the GCM tag 126, then the user key 118 is validated. If the GCM tag 126-1 does not match the GCM tag 126, then the user key 118 is invalidated. In an example in which the user key 118 is invalidated, then the user key 118 should not be used. If the GCM tag 126-1 matches the GCM tag 126, then the processor 104 executes instructions that cause the processor 104 to compare the usage limit 120A to a decrypted usage 127. If the decrypted usage 127 is greater than or equal to the usage limit 120A, then a request to use the user key 118 is rejected and an error code is returned. If the decrypted usage 127 is not greater than or equal to the usage limit 120A, then the user key 118 is allowed to be used to perform a cryptographic operation.

Figure 1C:
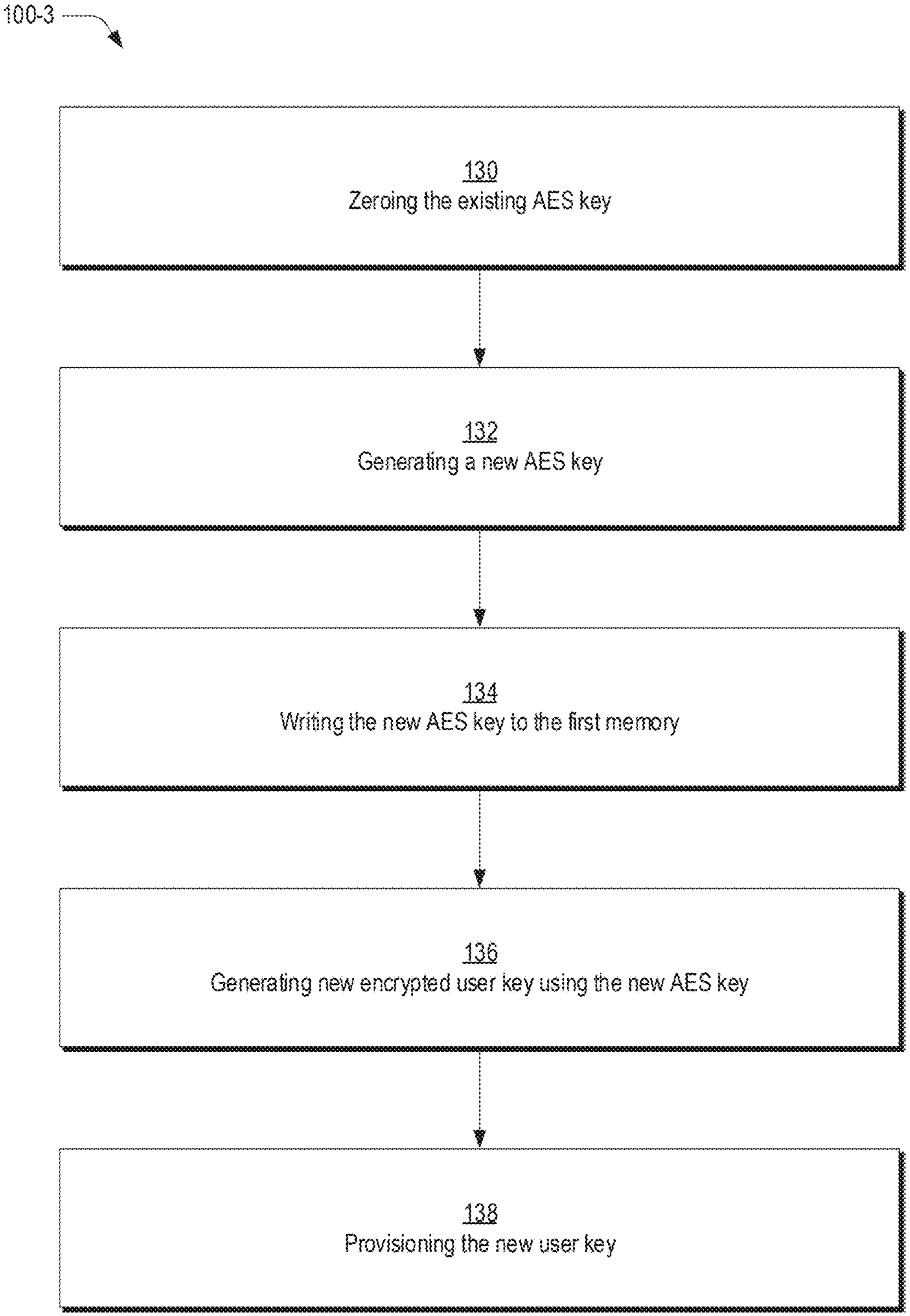
FIG. 1C is a flow diagram depicting a method for revoking a user key, according to some embodiments.

FIG. 1C is a flow diagram depicting a method 100-3 for revoking a user key, according to some embodiments. At operation 130, the AES key 122 is zeroed. For example, an event has occurred or failed to occur such that it is desirable to revoke the user key 118 in order to prevent the user key 118 from future use. In one or more embodiments, the processor 104 executes instructions which cause the processor 104 to write zeros over the AES key 122. By zeroing the AES key 122, it is no longer possible to decrypt the encrypted user key 124-1 and match the GCM tag 126-1 with the GCM tag 126.

At operation 132, a new AES key is generated. In some embodiments, the processor 104 executes instructions which cause the processor 104 to implement the RNG 105 to generate the new AES key. At operation 134, the new AES key is written to the first memory 112. In various embodiments, the instructions executed by the processor 104 cause the processor 104 to write the new AES key to the first memory 112.

At operation 136, a new encrypted user key is generated using the new AES key. In one or more embodiments, the processor 104 executes instructions which cause the processor 104 to implement the AES-GCM encryption/decryption circuitry 110 to encrypt the plaintext user key 118 as the new encrypted user key using the new AES key. At operation 138, the new user key is provisioned. In various embodiments, the processor 104 executes instructions that cause the processor 104 to make the new user key available for use. By zeroing the AES key 122 to revoke the user key 118, a single cryptographic key can be revoked a nearly unlimited number of times and new AES keys can be generated using the RNG 105. This is not possible utilizing bits of a programmable electronic fuse which are only available in limited numbers due to the associated economic costs.

Figure 1D:
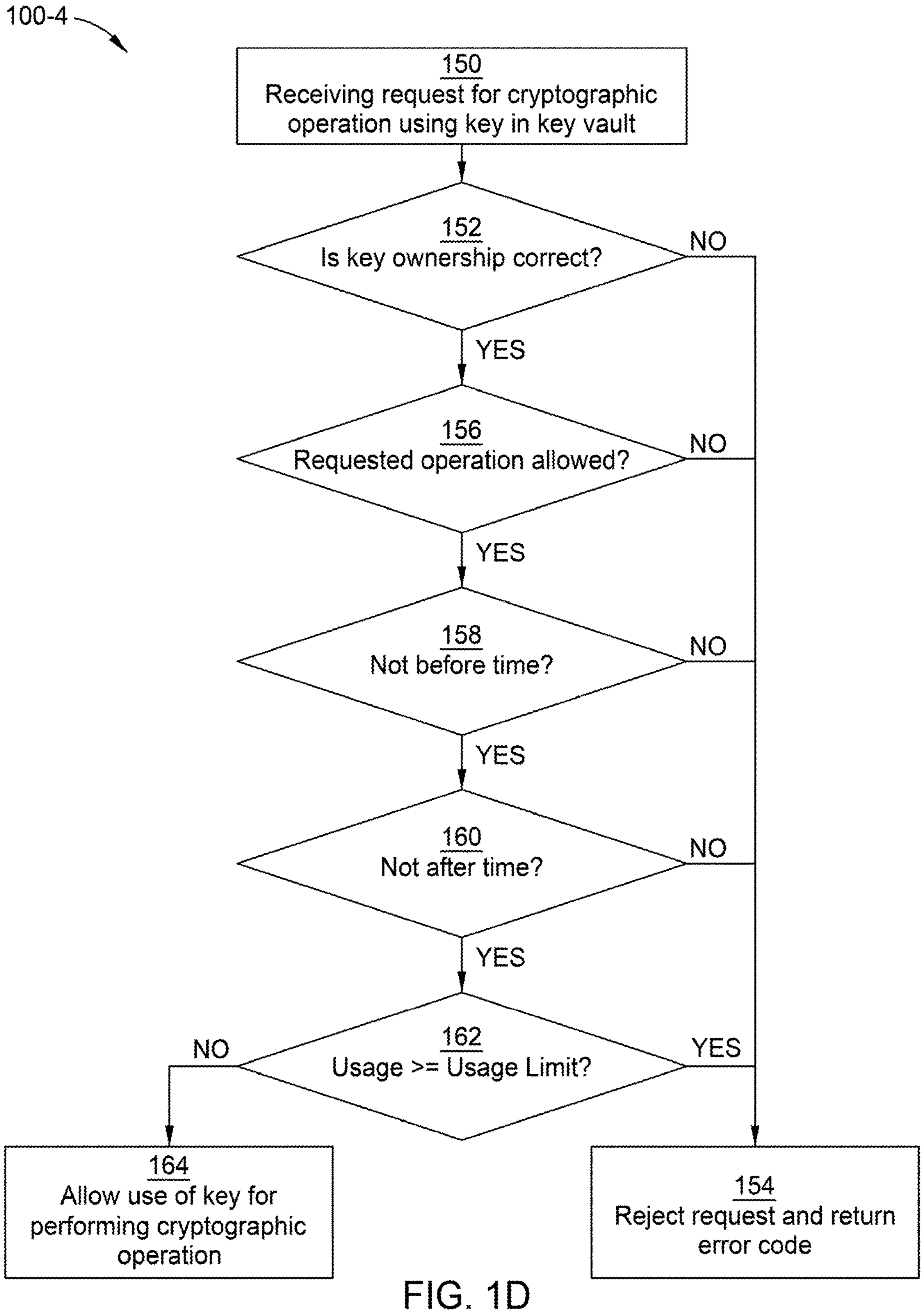
FIG. 1D is a flow diagram depicting a method for validating a user key based on a usage limit, according to some embodiments.

FIG. 1D is a flow diagram depicting a method 100-4 for validating a user key based on a usage limit, according to some embodiments. At operation 150, a request is received for performing a cryptographic operation using a key in a key vault. In some embodiments, the user key 118 is requested for use in performing a cryptographic operation.

At operation 152, a determination is made whether the key ownership is correct. If the user key 118 ownership is determined to be correct (Yes), then at operation 154, the request is rejected and an error code is returned. If the user key 118 ownership is not determined to be correct (No), then the method 100-4 proceeds to operation 156.

At operation 156, a determination is made whether the requested operation is allowed. If the requested operation is determined to be allowed (Yes), then at operation 154, the request is rejected and an error code is returned. If the requested operation is determined not to be allowed (No), then the method 100-4 proceeds to operation 158.

At operation 158, a determination is made whether a date/time is "not before" the beginning of use of the user key 118. If the date/time is determined to be "not before" the beginning of use of the user key 118 (Yes), then at operation 154, the request is rejected and an error code is returned. If the date/time is determined to not be "not before" the beginning of use of the user key 118 (No), then the method 100-4 proceeds to operation 160.

At operation 160, a determination is made whether the date/time is "not after" the end of use of the user key 118. If the date/time is determined to be "not after" the end of use of the user key 118 (Yes), then at operation 154, the request is rejected and an error code is returned. If the date/time is determined to not be "not after" the end of use of the user key 118 (No), then the method 100-4 proceeds to operation 162.

At operation 162, a determination is made whether the decrypted usage 127 is greater than or equal to the usage limit 120A. If the decrypted usage 127 is determined to be greater than or equal to the usage limit 120A (Yes), then at operation 154, the request is rejected and an error code is returned. If the decrypted usage 127 is determined not to be greater than or equal to the usage limit 120A (No), then the method 100-4 proceeds to operation 164.

At operation 164, the user key 118 is allowed to be used for performing the cryptographic operation. In some embodiments, if the user key 118 is allowed to be used for performing the cryptographic operation, then the processor 104 writes a usage update to the first memory 112 and updates the usage 121.

Figure 2A:
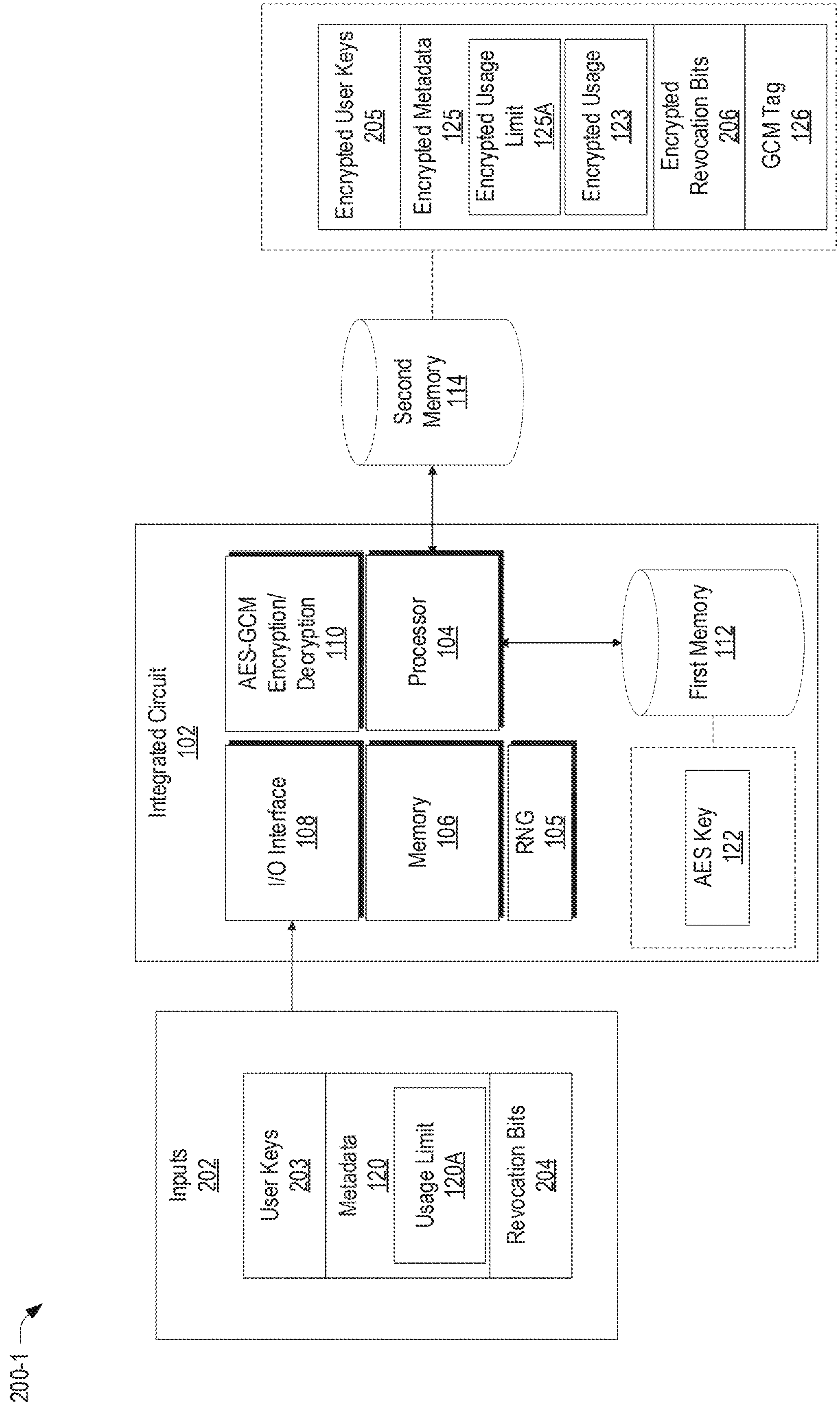
FIG. 2A illustrates a representation of provisioning user keys with revocation bits, according to some embodiments.

FIG. 2A illustrates a representation 200-1 of provisioning user keys with revocation bits, according to some embodiments. The representation 200-1 includes the integrated circuit 102 and the second memory 114. As shown, the I/O interface 108 receives inputs 202. The inputs 202 include user keys 203, the metadata 120, the usage limit 120A included in the metadata 120, and revocation bits 204. In some embodiments, the revocation bits 204 enable revocation of multiple different cryptographic keys by indicating a revocation status of each key of the user keys 203. For example, by reading the revocation bits 204, the revocation status of each key of the user keys 203 can be determined.

In various embodiments, the processor 104 executes instructions which cause the processor 104 to implement the RNG 105 to generate the AES key 122. In one or more embodiments, the instructions executed by the processor 104 cause the processor 104 to write the AES key 122 to the first memory 112. In some embodiments, the processor 104 executes instructions that cause the processor 104 to implement the AES-GCM encryption/decryption circuitry 110 to use the AES key 122 as the key for encrypting the user keys 203 as encrypted user keys 205, encrypting the metadata 120 as the encrypted metadata 125, encrypting the usage limit 120A as the encrypted usage limit 125A, encrypting the usage as the encrypted usage 123, encrypting the revocation bits 204 as encrypted revocation bits 206, and computing the GCM tag 126. In order to provision the user keys 203, the processor 104 writes the encrypted user keys 205, the encrypted metadata 125, the encrypted usage limit 125A, the encrypted usage 123, the encrypted revocation bits 206, and the GCM tag 126 to the second memory 114.

Figure 2B:
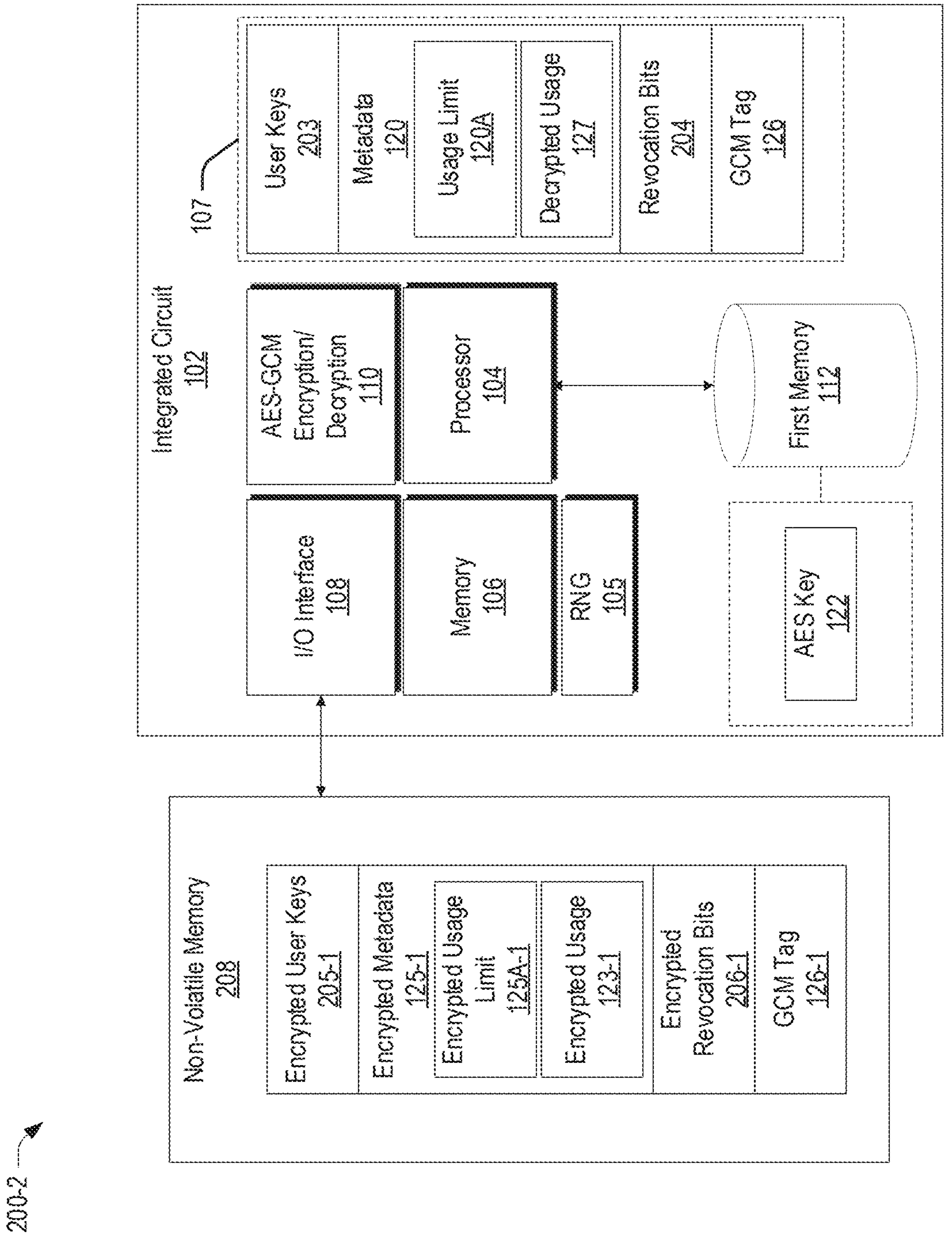
FIG. 2B illustrates a representation of validating/invalidating user keys with revocation bits, according to some embodiments.

FIG. 2B illustrates a representation 200-2 of validating/invalidating user keys with revocation bits, according to some embodiments. As shown, the processor 104 executes instructions which cause the processor to 104 read encrypted user keys 205-1, the encrypted metadata 125-1, the encrypted usage limit 125A-1, the encrypted usage 123-1, encrypted revocation bits 206-1, and the GCM tag 126-1 from a non-volatile memory 208 via the I/O interface 108. In one or more embodiments, the AES-GCM encryption/decryption circuitry 110 computes the GCM tag 126.

In some examples, the third memory 107 that is internal to the integrated circuit 102 includes the user keys 203, the metadata 120, the usage limit 120A included in the metadata 120, the decrypted usage 127 included in the metadata 120, the revocation bits 204, and the GCM tag 126. As described above, the processor 104 executes instructions which cause the processor 104 to compare the GCM tag 126-1 to the GCM tag 126. If the GCM tag 126-1 does not match the GCM tag 126, then the user keys 203 are invalidated. If the GCM tag 126-1 matches the GCM tag 126, then the user keys 203 are validated. If the GCM tag 126-1 matches the GCM tag 126, then the processor 104 executes instructions that cause the processor to determine whether the decrypted usage 127 is greater than or equal to the usage limit 120A. If the decrypted usage 127 is greater than or equal to the usage limit 120A, then a request to use the user keys 203 is rejected and an error code is returned. If the decrypted usage 127 is not greater than or equal to the usage limit 120A, then the user keys 203 are allowed to be used to perform cryptographic operations. If the user keys 203 are allowed to be used to perform the cryptographic operations, then the processor 104 updates the decrypted usage 127 to reflect an additional use of the user keys 203.

In order to determine whether any user keys included in the user keys 203 have been revoked, revocation bits included in the revocation bits 204 uniquely identify corresponding ones of the user keys included in the user keys 203. In some embodiments, the processor 104 executes instructions that cause the processor 104 to read the revocation bits 204 from the third memory 107 and use the unique identifications to identify a revocation status of each of the user keys included in the user keys 203. If the revocation status of particular user keys included in the user keys 203 indicates that the particular user keys are revoked, then the particular user keys are not used.

Figure 2C:
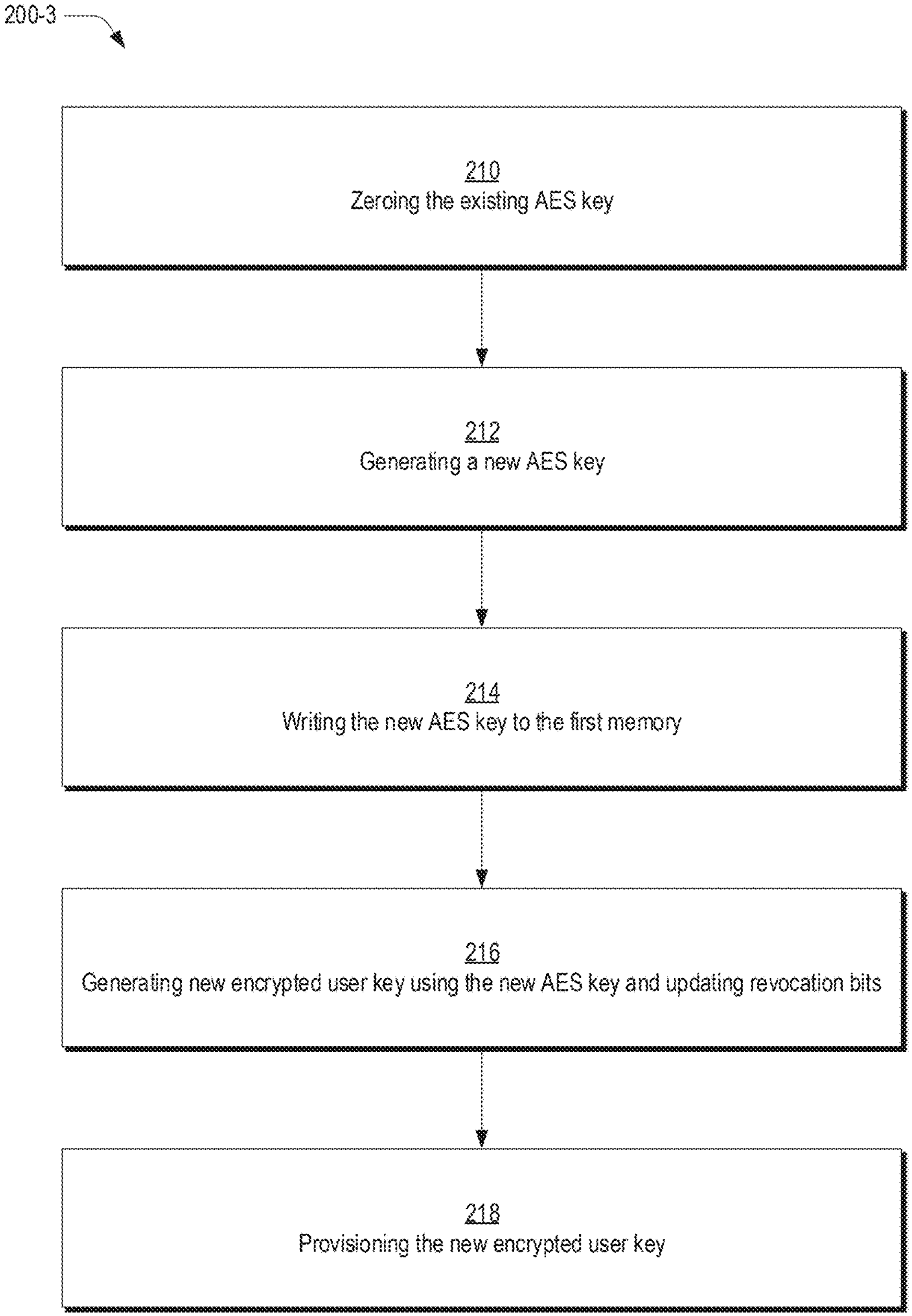
FIG. 2C is a flow diagram depicting a method for revoking user keys with revocation bits, according to some embodiments.

FIG. 2C is a flow diagram depicting a method 200-3 for revoking user keys with revocation bits, according to some embodiments. At operation 210, the AES key 122 is zeroed. For example, the user keys 203 have become insecure. In one or more embodiments, the processor 104 executes instructions which cause the processor 104 to write zeros over the AES key 122. By zeroing the AES key 122, it is no longer possible to decrypt the encrypted user keys 205-1 and match the GCM tag 126-1 with the GCM tag 126.

At operation 212, a new AES key is generated. In one or more embodiments, the processor 104 executes instructions which cause the processor 104 to implement the RNG 105 to generate a random new AES key. At operation 214, the new AES key is written to the first memory 112. In various embodiments, the instructions executed by the processor 104 cause the processor 104 to write the new AES key to the first memory 112.

At operation 216, a new encrypted user key is generated using the new AES key and the revocation bits 204 are updated. At operation 218, the new user key is provisioned. In various embodiments, the processor 104 executes instructions that cause the processor 104 to make the new user key available for use.

Figure 3A:
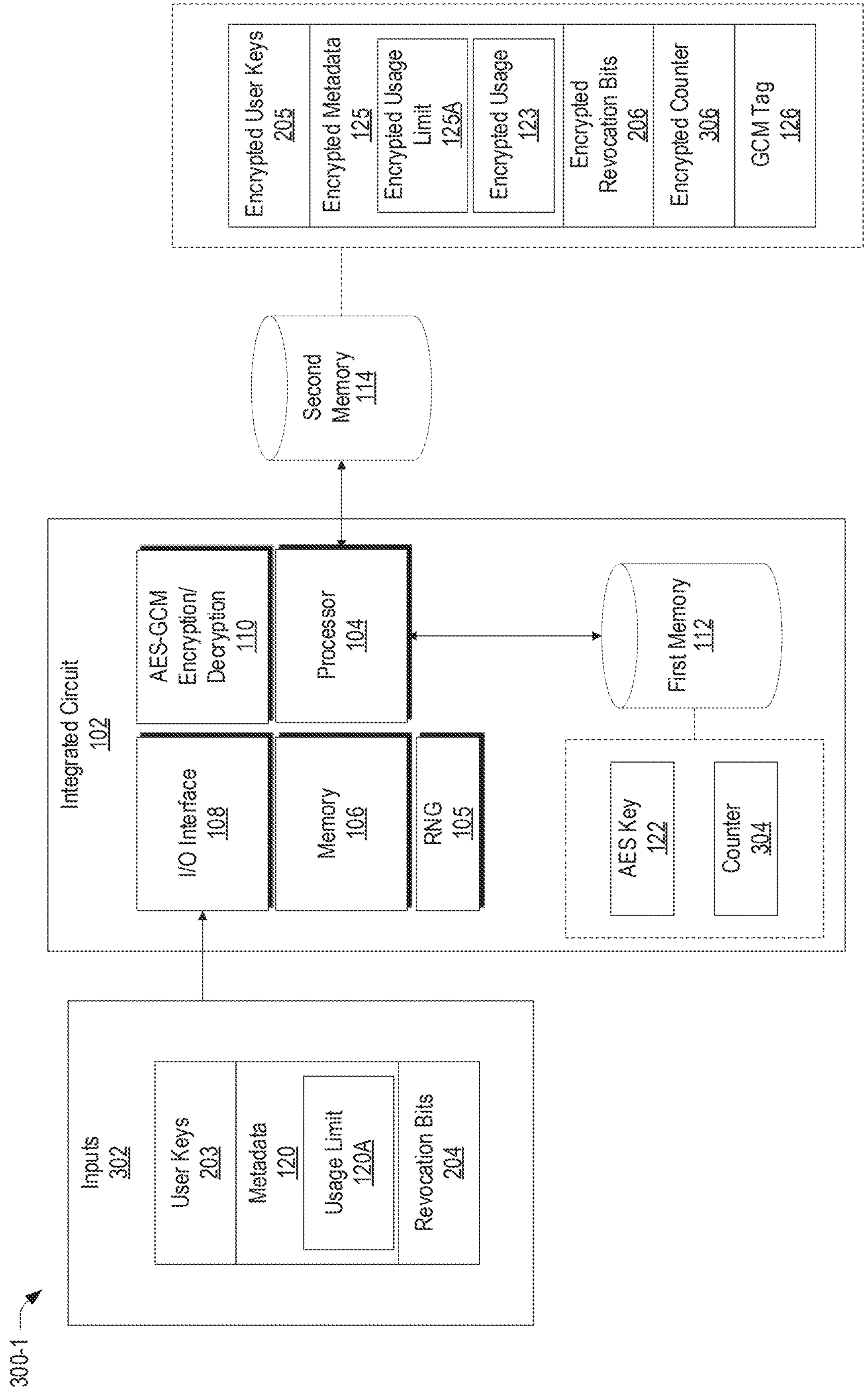
FIG. 3A illustrates a representation of provisioning user keys with counter values, according to some embodiments.

FIG. 3A illustrates a representation 300-1 of provisioning user keys with counter values, according to some embodiments. For instance, the representation 300-1 includes the integrated circuit 102 and the second memory 114. As shown, the I/O interface 108 receives inputs 302. The inputs 302 include the user keys 203, the metadata 120, the usage limit 120A included in the metadata 120, and the revocation bits 204. The processor 104 executes instructions that cause the processor 104 to generate the AES key 122 using the RNG 105 and write the AES key 122 to the first memory 112. As shown, the processor 104 also writes a counter value 304 of a counter to the first memory 112. In some embodiments, the counter value 304 is a unique value which can be used to identify a replay attack.

The AES-GCM encryption/decryption circuitry 110 uses the AES key 122 to encrypt the user keys 203 as encrypted user keys 205, encrypt the metadata 120 as encrypted metadata 125, encrypt the usage limit 120A as the encrypted usage limit 125A, encrypt the usage as the encrypted usage 123, encrypt the revocation bits 204 as encrypted revocation bits 206, encrypt the counter value 304 as an encrypted counter value 306, and compute the GCM tag 126. In order to provision the user keys 203, the processor 104 executes instructions that cause the processor 104 to write the encrypted user keys 205, the encrypted metadata 125, the encrypted usage limit 125A, the encrypted usage 123, the encrypted revocation bits 206, the encrypted counter value 306, and the GCM tag 126 to the second memory 114.

Figure 3B:
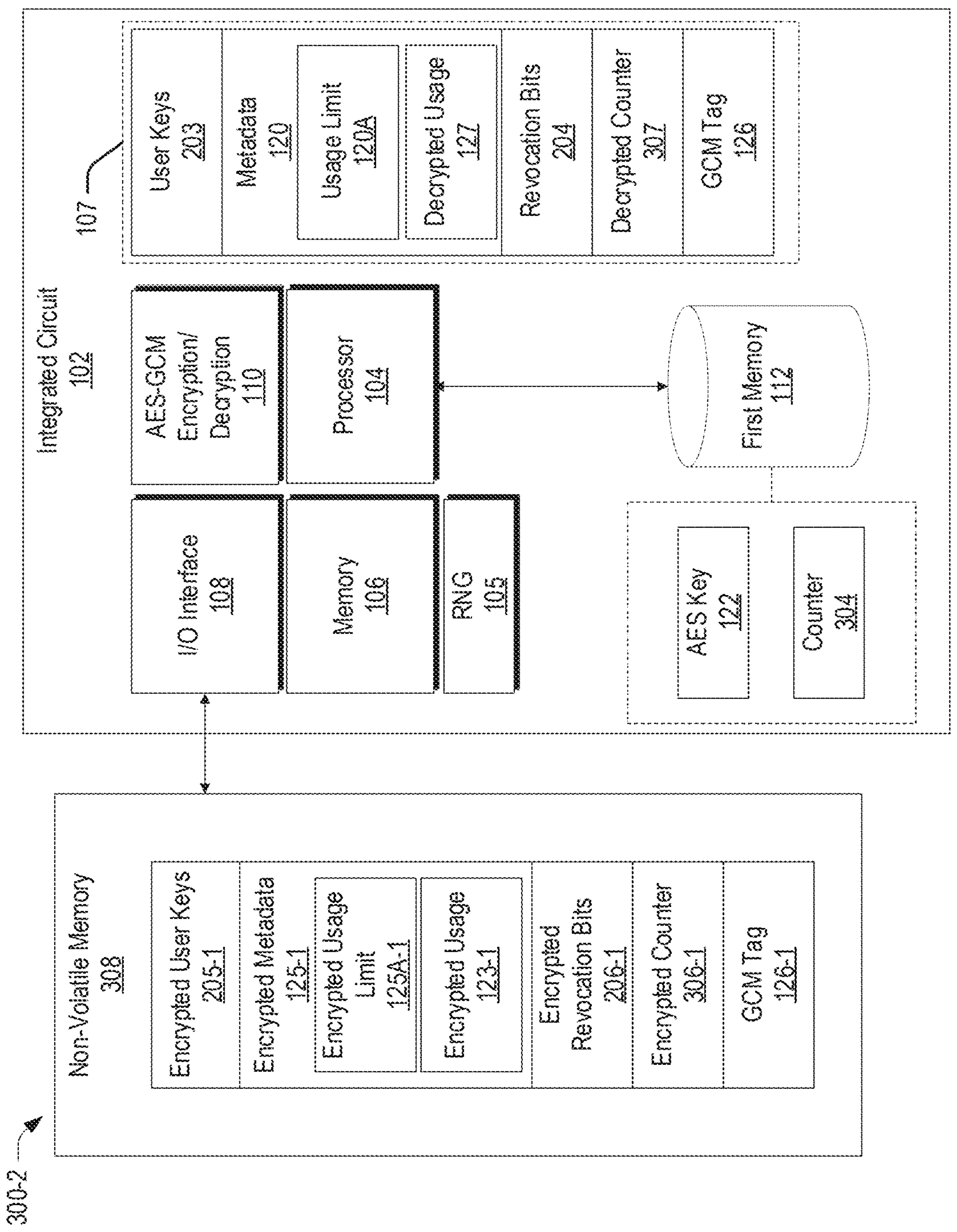
FIG. 3B illustrates a representation of validating/invalidating user keys with counter values, according to some embodiments.

FIG. 3B illustrates a representation 300-2 of validating/invalidating user keys with counter values, according to some embodiments. As shown, the processor 104 executes instructions that cause the processor 104 to read encrypted user keys 205-1, the encrypted metadata 125-1, the encrypted usage limit 125A-1, the encrypted usage 123-1, the encrypted revocation bits 206-1, an encrypted counter value 306-1, and the GCM tag 126-1 from a non-volatile memory 308. In some embodiments, the AES-GCM encryption/decryption circuitry 110 computes the GCM tag 126. The processor 104 executes instructions that cause the processor 104 to validate/invalidate the user keys 203 by comparing the GCM tag 126-1 to the GCM tag 126 stored in the third memory 107 that is internal to the integrated circuit 102 as described previously. Similarly, the processor 104 executes instructions that cause the processor 104 to compare the decrypted usage 127 with the usage limit 120A as described above.

In some embodiments, the AES-GCM encryption/decryption circuitry 110 decrypts the encrypted user keys 205-1, the encrypted metadata 125-1, the encrypted usage limit 125A-1, the encrypted usage 123-1, the encrypted revocation bits 206-1, and the encrypted counter value 306-1. The user keys 203, the metadata 120, the usage limit 120A, the decrypted usage 127, the revocation bits 204, a decrypted counter value 307, and the GCM tag 126 are stored in the third memory 107. If the decrypted counter value 307 does not match the counter value 304, then a replay attack has been identified and the user keys 203 should not be used. The processor 104 also determines if any user keys included in the user keys 203 have been revoked using revocation bits included in the revocation bits 204 as described above.

Figure 3C:
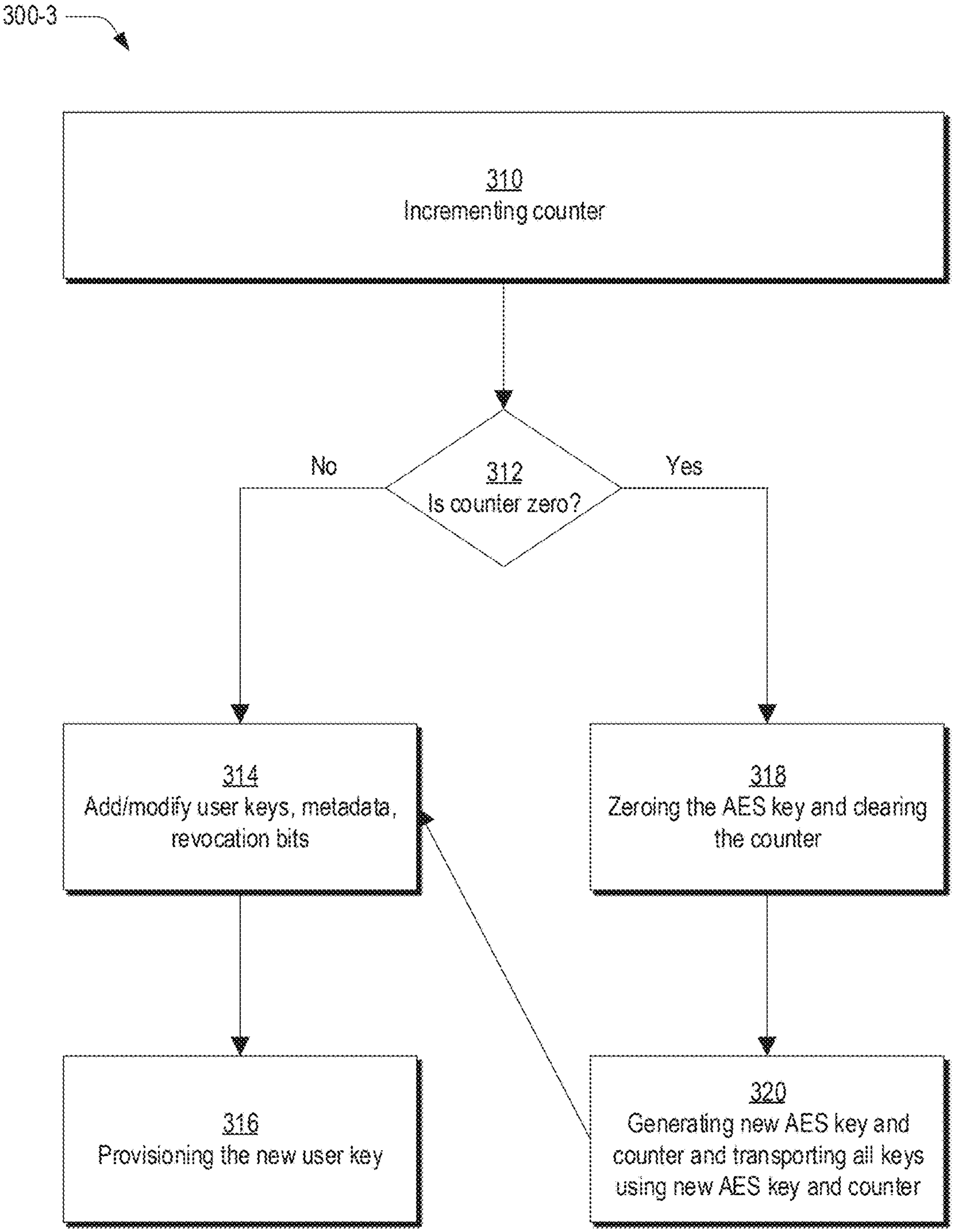
FIG. 3C is a flow diagram depicting a method for revoking user keys with counter values, according to some embodiments.

FIG. 3C is a flow diagram depicting a method 300-3 for revoking user keys with counter values, according to some embodiments. At operation 310, a counter is incremented. In various embodiments, the processor 104 executes instructions that cause the processor 104 to increment the counter value 304. At operation 312, a determination is made whether or not the counter value 304 is zero. If the counter value 304 is not zero (No), then at operation 314, the user keys 203, the metadata 120, and the revocation bits 204 are modified as per a lifecycle of each of the user keys 203. At operation 316, a new user key is provisioned. In various embodiments, the processor 104 makes the new user key available for use.

At operation 312, if a determination is made that the counter value 304 is zero (Yes), then at operation 318, the AES key 122 is zeroed and the counter is cleared. In some embodiments, the processor 104 executes instructions that cause the processor 104 to write zeros over the AES key 122 and clear the counter. At operation 320, a new AES key and counter are generated and all provisioned keys are transported using the new AES key and counter. In one or more examples, the AES-GCM encryption/decryption circuitry 110 encrypts new user keys, metadata, revocation bits, and counter using the new AES key. At operation 314, the user keys 203, the metadata 120, and the revocation bits 204 are modified as per a lifecycle of each of the user keys 203. At operation 316, the new user key is provisioned.

Figure 4:
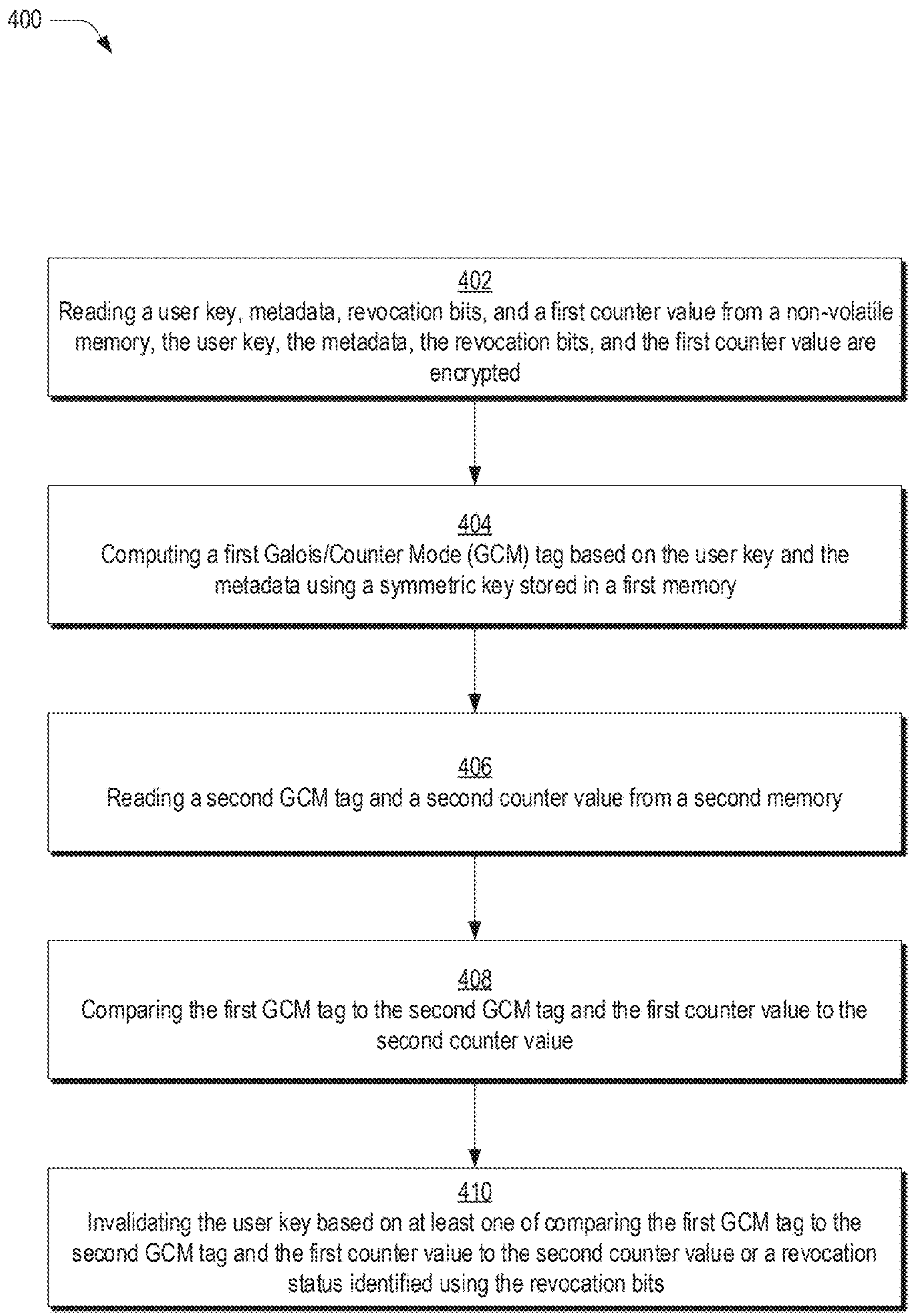
FIG. 4 is a flow diagram depicting a method for invalidating user keys, according to some embodiments.

FIG. 4 is a flow diagram depicting a method 400 for invalidating user keys, according to some embodiments. At operation 402, a user key, metadata, revocation bits, and a first counter value are read from a non-volatile memory, the user key, the metadata, the revocation bits, and the first counter value are encrypted. In some embodiments, the processor 104 reads the encrypted user keys 205-1, the encrypted metadata 125-1, the encrypted revocation bits 206-1, and the encrypted counter value 306-1 from the non-volatile memory 308.

At operation 404, a first Galois/Counter Mode (GCM) tag is computed based on the user key and the metadata using a symmetric key stored in a first memory. In one or more embodiments, the AES-GCM encryption/decryption circuitry 110 computes the GCM tag 126-1 using the AES key 122.

At operation 406, a second GCM tag and a second counter value are read from a second memory. In various embodiments, the processor 104 reads the GCM tag 126 and the counter value 304 from the third memory 107 that is internal to the integrated circuit 102.

At operation 408, the first GCM tag is compared to the second GCM tag and the first counter value is compared to the second counter value. In some embodiments, the processor 104 compares the GCM tag 126-1 to the GCM tag 126 and compares the counter value included in the encrypted counter value 306-1 to the counter value 304.

At operation 410, the user key is invalidated based on at least one of comparing the first GCM tag to the second GCM tag and the first counter value to the second counter value or a revocation status identified using the revocation bits. In one or more embodiments, the user keys 203 are invalidated because the GCM tag 126-1 does not match the GCM tag 126, the counter value included in the encrypted counter value 306-1 does not match the counter value 304, or the revocation bits 204 indicate that the user keys included in the encrypted user keys 205-1 are revoked.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

While the foregoing is directed to specific examples, other and further examples may be devised without departing from the basic scope thereof, and the scope thereof is determined by the claims that follow.

What is claimed is:

1. An integrated circuit comprising:

an input/output interface configured to receive inputs including plaintext user keys, metadata, and revocation bits;

cryptographic circuitry configured to:

read a key from a first memory internal to the integrated circuit;

encrypt the plaintext user keys based on the key to provide encrypted user keys;

encrypt the metadata based on the key to provide encrypted metadata;

encrypt the revocation bits based on the key to provide encrypted revocation bits; and compute a Galois/Counter Mode (GCM) tag based on the key for authentication of the encrypted user keys, the encrypted metadata, and the encrypted revocation bits; and a processor configured to write the encrypted user keys, the encrypted metadata, the encrypted revocation bits, and the GCM tag to a second memory external to the integrated circuit to provision the plaintext user keys, wherein the cryptographic circuitry has read access to the first memory and wherein the key stored in the first memory is accessible to the cryptographic circuitry and inaccessible to the processor.

2. The integrated circuit of claim 1, further comprising a random number generator (RNG) configured to generate the key.

3. The integrated circuit of claim 1, wherein the first memory includes battery-backed random access memory (BBRAM).

4. The integrated circuit of claim 1, wherein the cryptographic circuitry has read-only access to the first memory.

5. The integrated circuit of claim 1, wherein the processor has write-only access to the first memory for storing the key in the first memory.

6. The integrated circuit of claim 1, wherein the metadata describes a usage limit for the plaintext user keys.

7. The integrated circuit of claim 6, wherein the usage limit for the plaintext user keys includes a number of uses.

8. The integrated circuit of claim 6, wherein the usage limit for the plaintext user keys includes an amount of data processed.

9. The integrated circuit of claim 1, wherein the revocation bits indicate a revocation status of each of the plaintext user keys.

10. The integrated circuit of claim 1, wherein the cryptographic circuitry is further configured to:

read a counter value from the first memory; and generate an encrypted counter value by encrypting the counter value using the key.

11. The integrated circuit of claim 10, wherein the processor is further configured to write the encrypted counter value to the second memory to provision the plaintext user keys.

12. A system comprising:

one or more processors; and at least one memory coupled to the one or more processors, the at least one memory including a set of instructions that, when executed by the one or more processors, cause the one or more processors to:

read a user key, metadata, and revocation bits from a non-volatile memory, wherein the user key, the metadata, and the revocation bits are encrypted by a cryptographic circuitry;

compute a first Galois/Counter Mode (GCM) tag based on the user key, the metadata, and the revocation bits using a symmetric key stored in a first memory internal to an integrated circuit;

compare the first GCM tag to a second GCM tag stored in a second memory external to the integrated circuit to provide a comparison; and determine validity of the user key based on the comparison and a revocation status identified using the revocation bits, wherein the cryptographic circuitry has read access to the first memory and wherein the symmetric key stored in the first memory is accessible to the cryptographic circuitry and inaccessible to the one or more processors.

13. The system of claim 12, wherein the metadata describes a usage limit for the user key, and wherein the user key is revoked if a usage of the user key is greater than or equal to the usage limit.

14. The system of claim 12, wherein the set of instructions, when executed, further cause the one or more processors to determine the validity by:

reading a first counter value from the non-volatile memory;

reading a second counter value from the second memory;

comparing the first counter value to the second counter value; and invalidating the user key based on comparing the first counter value to the second counter value.

15. The system of claim 14, wherein the first counter value is encrypted.

16. The system of claim 15, wherein the set of instructions, when executed, further cause the one or more processors to:

increment the second counter value to a third counter value; and determine whether the third counter value is zero.

17. The system of claim 16, wherein the set of instructions, when executed, further cause the one or more processors to cause the cryptographic circuitry to zero the symmetric key.

18. A method performed by a processor, the method comprising:

reading a user key, metadata, revocation bits, a first counter value, a usage limit, and a usage from a non-volatile memory, wherein the user key, the metadata, the revocation bits, the first counter value, the usage limit, and the usage are encrypted by a cryptographic circuitry;

computing a first Galois/Counter Mode (GCM) tag based on the user key, the metadata, and the revocation bits using a symmetric key stored in a first memory internal to an integrated circuit;

reading a second GCM tag and a second counter value from a second memory external to the integrated circuit;

comparing the first GCM tag to the second GCM tag, the first counter value to the second counter value, and the usage to the usage limit; and invalidating the user key based on at least one of comparing the first GCM tag to the second GCM tag, comparing the first counter value to the second counter value, comparing the usage to the usage limit, or a revocation status identified using the revocation bits, wherein the cryptographic circuitry has read access to the first memory and wherein the symmetric key stored in the first memory is accessible to the cryptographic circuitry and inaccessible to the processor.

19. The method of claim 18, wherein the first memory includes battery-backed random access memory (BBRAM).

20. The method of claim 18, further comprising:

generating an additional user key; and incrementing the second counter value to a third counter value.

* * * * *